United States Patent
Kelem et al.

[15] 3,686,565

[45] Aug. 22, 1972

[54] FREQUENCY DETECTOR

[72] Inventors: Lester S. Kelem, Parsippany; Stephen E. Reade, Nutley, both of N.J.

[73] Assignee: The United States of America as represented by the Secretary of the Army

[22] Filed: Dec. 1, 1970

[21] Appl. No.: 94,127

[52] U.S. Cl. .............324/79 D, 324/78 D, 324/78 Q
[51] Int. Cl. .........................G01r 23/14, G01r 23/02
[58] Field of Search......324/79 D, 79, 78 D; 328/141

[56] References Cited

UNITED STATES PATENTS 3,569,830   3/1971   Gass et al.................324/79 D

*Primary Examiner*—Alfred E. Smith
*Attorney*—Harry M. Saragovitz, Edward J. Kelly and Herbert Berl

[57] ABSTRACT

An electronic apparatus for detecting gross shifts in the frequency of electronic oscillators employed in time-fuse weapon systems consisting of two parallel accumulator channels, each consisting of a series of connected flip-flops. One of the channels accumulates pulses from an accurate oscillator and the other from the fuse oscillator. The outputs of the channels are each connected to gate means which function in response to the outputs to provide an indication of the acceptability of nonacceptability of the fuse oscillator frequency.

5 Claims, 1 Drawing Figure

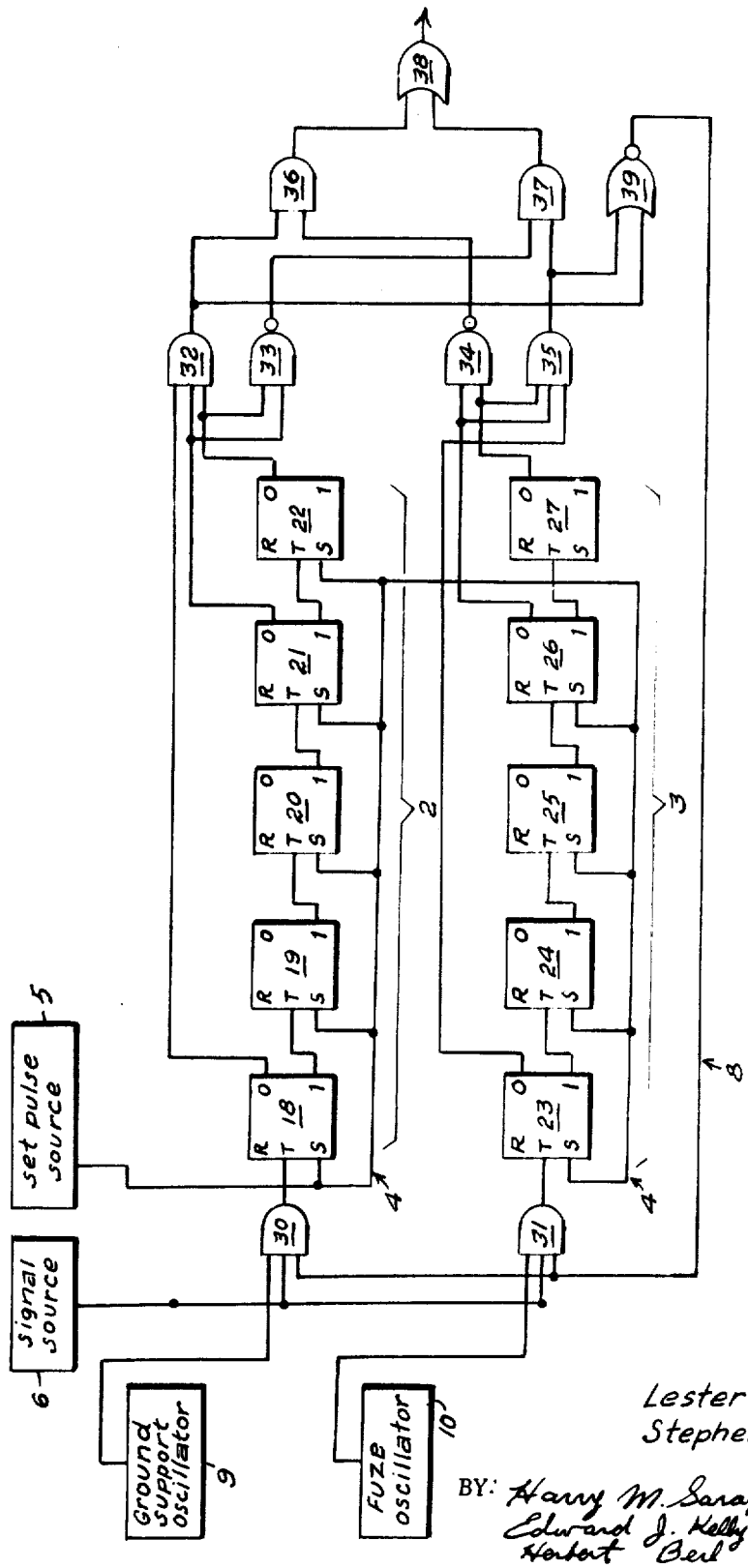

FREQUENCY DETECTOR

The invention described herein may be manufactured, used, and licensed by or for the Government for governmental purposes without the payment to us of any royalty thereon.

Army weapon systems which have to remain in storage for long periods of time prior to actual operation undergo variations in characteristics. System design considerations minimize the drift due to aging. However, radical changes due to gross failure of a component can occur even with proper design considerations. In particular, electronic systems, such as timefuse weapon systems, depend upon electronic oscillators for accurate timing. It therefore is mandatory that the oscillator frequency be monitored prior to committing the weapon.

Accordingly, the object of the invention is an inexpensive, uncomplicated circuit designed to detect a gross permanent shift in fuse oscillator frequency. As part of the artillery rocket ground support equipment this circuit compares the frequency in question with an accurate stable frequency standard which is also contained in the ground support equipment. Briefly, the device of the invention consists of two parallel accumulator channels, one of which accumulates pulses from the accurate stable frequency standard or ground support oscillator and the other of which accumulates pulses from the electronic oscillator of the fuse. The outputs of the accumulators are coupled to a combination of gating means whereby an indication of the difference or coincidence of frequencies of the oscillators is obtained.

The novel features which are considered characteristic of the invention are set forth with particularity in the appended claims. The invention itself, however, both as to its organization and method of operation as well as additional objects and advantages thereof, will be best understood from the following description taken in conjunction with the sole FIGURE in the drawing.

Referring now to the sole FIGURE in the drawing, reference numeral 2 indicates an electronic accumulator consisting of a series of flip-flops and 3 indicates another electronic accumulator consisting of a series of flip-flops. For the purpose of the invention each accumulator has a storage capacity of 32 states and the circuit is wired to offer a sensitivity of one pulse in 25 or a 4 percent discrepancy detection which has been found to be sufficient for checking out the fuse oscillator. However, if desired, the sensitivity can be improved quite readily in two ways: (1) By increasing the gating and (2) By adding flip-flop stages to each accumulator. For example, by including just one additional flip-flop in each accumulator, the sensitivity becomes one pulse in 48 or approximately 2 percent discrepancy detection. Since it has been determined that the fuse oscillator accuracy should be on the order of tenths of a percent, not more than 1 percent, these modifications unnecessarily increase the cost and complexity of the ground support equipment. Therefore, in the instant design, if the frequency of the fuse oscillator has changed more than 4 percent, it will be readily detected.

Accumulator 2 consists of flip-flops 18, 19, 20, 21, and 22 wherein each stage has its trigger input, T, coupled to the true output, 1, of the preceding stage with the exception of the first stage 18 which has its trigger input, T, coupled to the output of an AND gate 30. The stages of accumulator 3 consists of flip-flops 23, 24, 25, 26, and 27 with the trigger inputs, T, and true outputs, 1, connected in the same manner as described in conjunction with accumulator 2 with the exception that the trigger input of flip-flop 23 is connected to the output of AND gate 31. The true inputs, S, of the flip-flops of both accumulators have a common connection, generally indicated by 4, with a set pulse source 5. A signal source 6, normally the output of a serial gate inhibit flip-flop in the electronic fuse, not shown, is coupled to a first input of each AND gate 30 and 31 for the purpose of obtaining a one state thereat. A second signal, NOR gate 39, is coupled to the second input of each AND gate 30 and 31 by means of a common connection, indicated by reference numeral 8, between said second inputs and the output of NOR gate 39. A third input signal is provided AND gate 30 by means of ground support or accurate frequency standard electronic oscillator 9 which is coupled to a third input of AND gate 30. The third input signal to AND gate 31 is provided by the fuse electronic oscillator 10 which is coupled thereto.

The false output, 0, of each flip-flop 18, 21 and 22 is coupled to a respective input of AND gate 32 and false output, 0, of each flip-flop 23, 26, and 27 is coupled to a respective input of AND gate 35. The false output, 0, of each flip-flop 21 and 22 is also coupled to respective inputs of NAND gate 33 and false output, O, of each flip-flop 26 and 27 is coupled to respective inputs of NAND gate 34. The output of AND gate 32 is coupled to one input of AND gate 36 and the output of NAND gate 34 is coupled to another input of AND gate 36 which has its output coupled to one input of OR gate 38, the indicating signal being obtained from the output thereof. The output of AND gate 35 is coupled to one input of AND gate 37 and the output of NAND gate 33 is coupled to another input thereof, AND gate 37 has its output coupled to another input of OR gate 38. NOR gate 39 has one input coupled to the output of And gate 32 and another input coupled to the output of AND gate 35.

In operation, the outputs of ground support oscillator 9 and fuse oscillator 10 are applied to one input of AND gates 30 and 31, respectively. The "one" output of NOR gate 39 is coupled to another input of each AND gate 30 and 31. A set pulse from set pulse source 5 is applied to the true input, S, of each flip-flop and then a signal from signal source 6 is applied to the third input of each AND gate 30 and 31 enabling these gates whereupon the pulses from ground support oscillator 9 and fuse oscillator 10 are simultaneously transferred therethrough to accumulators 2 and 3, respectively, which then start storing these pulses. If the fuse oscillator 10 frequency is faster than the ground support oscillator 9 frequency, flip-flops 26, 27, and 23 will change state before flip-flops 21, 22, and 18. When 25 pulses from fuse oscillator 10 have entered accumulator 3, the false outputs, 0, of flip-flops 23, 26, and 27 become "ones" and AND gate 35 is thereby enabled providing one input to AND gate 37. If 24 pulses from ground support oscillator 9 have not yet entered accumulator 2, the false outputs, 0, of flip-flops 21 and 22 are not both "ones" whereby the output of NAND gate 33 remains a "one" providing a second input to AND gate 37 whose output then becomes a "one" coupled to an input of OR gate 38 which in response thereto produces a "one" or signal output which indicates that 25 pulses were delivered by fuse oscillator 10 but less than 24 pulses were delivered by the ground support oscillator 9. This means a discrepancy of 1 pulse out of 25 or a 4 percent discrepancy was detected whereupon the mission is automatically stopped by means not shown. Considering another condition, if the ground support oscillator 9 frequency is faster than the fuse oscillator 10 frequency then flip-flops 18, 21, and 22 will change state before flip-flops 23, 26, and 27. When 25 pulses from ground support oscillator 9 have entered accumulator 2, the false outputs, 0, of flip-flops 18, 21, and 22 become "one" and AND gate 32 is thereby enabled providing one input to AND gate 36. If 24 pulses from fuse oscillator 10 have not yet entered accumulator 3, the false outputs, 0, of flip-flops 26 and 27 are not both "ones" whereby the output of NAND gate 34 remains a "one" providing a second input to AND gate 36 whose output then becomes a "one" coupled to another input of OR gate 38 which in response thereto produces a "one" or signal output which indicates that 25 pulses were delivered by the ground support oscillator 9, but less than 24 pulses were delivered by fuse oscillator 10. This also means a discrepancy of one pulse out of 25 or a 4 percent discrepancy was detected whereupon the mission is automatically stopped by means not shown.

Considering the above descriptions of the circuit functions, it becomes apparent that if at least 24 pulses from ground support oscillator 9 have entered accumulator 2 when 25 pulses from fuse oscillator 10 have entered accumulator 3, the output of NAND gate 33 becomes a "zero" whereupon AND gate 37 is inhibited resulting in no pulse being delivered from the output of OR gate 38, indicating that the difference in frequency of the ground support oscillator 9 and fuse oscillator 10 is within 4 percent and that the mission can be completed. Similarly, if at least 24 pulses from fuse oscillator 10 have entered accumulator 3 when 25 pulses from ground support oscillator have entered accumulator 2, the output of NAND gate 34 becomes a "zero" whereupon AND gate 36 is inhibited resulting in no pulse being delivered from the output of OR gate 38 which also indicates that the difference in frequency of the ground support oscillator 9 and fuse oscillator 10 is within 4 percent.

In addition to delivering a pulse to AND gate 37, a second function of AND gate 35 is to deliver a pulse to NOR gate 39 when 25 pulses have entered accumulator 3. This causes the output of NOR gate 39 to go to "zero" thus inhibiting AND gates 30 and 31. Similarly, when 25 pulses have entered accumulator 2, AND gate 32 delivers a pulse to NOR gate 39 which also causes the output thereof to go to "zero" whereby AND gates 30 and 31 are inhibited. Thus, it can be seen that when 25 pulses, enter either accumulator, the output of a NOR gate 39 goes to "zero" and as a result the AND gates 30 and 31 are inhibited whereby additional pulses are prevented from entering the circuit.

We claim:

1. Electronic apparatus for detecting gross shifts in the frequency of electronic oscillators employed in time-fuse weapon systems comprising in combination:
first and second parallel accumulators each comprising a five stage flip-flop wherein the true output of each flip-flop is connected to the trigger input of the succeeding flip-flop;
means coupling a standard electronic oscillator to the trigger input of the first flip-flop of said five stage flip-flop of the first accumulator whereby the first accumulator accumulates pulses;
a first AND gate having its inputs coupled to the false outputs of the first, fourth, and fifth flip-flop of the first accumulator;
a first NAND gate;
a signal indicating means;
a second AND gate having one input coupled to the output of the first AND gate and another input coupled to the output of a the first NAND gate and its output coupled to the signal indicating means for providing an indicating signal when said first AND gate is enabled by the output of said first accumulator, said first NAND gate having one input coupled to a false output of the fifth flip-flop and another input coupled to the false output of the fourth flip-flop of the second accumulator;
means coupling an electronic oscillator of a fuse to the trigger input of the first flip-flop of the five stage flip-flop of said second accumulator whereby the second accumulator accumulates pulses;
a third AND gate having its inputs coupled to the false output of the first, fourth, and fifth flip-flops of said second accumulator;
and
a second NAND gate;
a fourth AND gate having one input coupled to the output of a second NAND gate and its output coupled to said means for producing an indicating signal when said third AND gate is enabled by the output of the second accumulator, said second NAND gate having one input coupled to a false output of the fifth flip-flop and another input coupled to the false output of the fourth flip-flop of the first accumulator;
said fourth and fifth flip-flops of the first accumulator adapted not to switch their false outputs when less than 24 pulses have been admitted to the first accumulator during the time when 25 pulses have been admitted to the second accumulator whereupon the output of the second NAND gate provides a "one" input to the fourth AND gate, and said first, fourth, and fifth flip-flops of the second accumulator switching their false outputs to "ones" whereby the third AND gate is enabled providing a second input to the fourth AND gate which in response thereto the said means for providing an indicating signal is enabled indicating an undesired discrepancy in fuse oscillator frequency.

2. The invention in accordance with claim 1 including a set pulse source coupled to the true inputs of all the flip-flops of said accumulators whereby said flip-flops are placed in a set condition upon application of a pulse from said source.

3. The invention in accordance with claim 2 wherein said means coupling a standard electronic oscillator to the trigger input of said first flip-flop of the first accumulator comprises a fifth AND gate having coupled to a first input thereof said standard electronic oscillator and having the output thereof coupled to the trigger input of the first flip-flop of said first accumulator, and wherein said means for coupling an electronic oscillator of a fuse to said trigger input of the first flip-flop of said second accumulator comprises a sixth AND gate having coupled to a first input thereof said electronic oscillator of the fuse.

4. The invention in accordance with claim 3 and a NOR gate having one input coupled to the output of said first AND gate and another input coupled to the output of said third AND gate with its output coupled to a second input of both the fifth and sixth AND gates providing a signal input thereto, but operative to inhibit said fifth and sixth AND gates when 25 pulses have entered either accumulator.

5. The invention in accordance with claim 4 and a signal source coupled to a third input of each said fifth and sixth AND gates and operative to enable said AND gates whereby pulses are coupled from the standard electronic oscillator to said first accumulator and from the electronic oscillator of the fuse to said second accumulator.

* * * * *